United States Patent [19]
Owen

[11] 3,878,593
[45] Apr. 22, 1975

[54] METHOD OF MANUFACTURING A BIMETAL FINNED TUBE

[75] Inventor: Tom E. Owen, Houston, Tex.

[73] Assignee: Hudson Products Corporation, Houston, Tex.

[22] Filed: May 1, 1974

[21] Appl. No.: 465,742

[52] U.S. Cl.. 29/157.3 A; 29/157.3 AH; 29/DIG. 1; 29/DIG. 47; 72/96
[51] Int. Cl................. B21d 53/02; B23p 15/26
[58] Field of Search............ 29/157.3 A, 157.3 AH, 29/157.3 B, DIG. 1; 72/77, 96; 29/DIG. 47

[56] References Cited
UNITED STATES PATENTS

| 2,586,653 | 2/1952 | Hill | 29/157.3 AH |
|---|---|---|---|
| 2,779,223 | 1/1957 | Schuster | 29/157.3 AH X |
| 2,958,121 | 11/1960 | Toscher | 29/157.3 AH X |
| 3,068,563 | 12/1962 | Reverman | 29/DIG. 1 |
| 3,833,987 | 9/1974 | Owen | 29/157.3 A |

Primary Examiner—C. W. Lanham
Assistant Examiner—D. C. Reiley, III
Attorney, Agent, or Firm—W. F. Hyer; Marvin B. Eickenroht

[57] ABSTRACT

A method of manufacturing bi-metal finned tubes wherein a tube of fin stock is assembled about a tube liner, and the assembled tubes are passed through an array of rotatable finning discs arranged to raise helical fins on the outer diameter of fin stock, while, at the same time, pressing its inner diameter tightly against the outer diameter of the tube liner, the trailing end of the tube of fin stock being restrained against longitudinal movement away from its leading end during such passage of the assembly of tubes.

10 Claims, 12 Drawing Figures

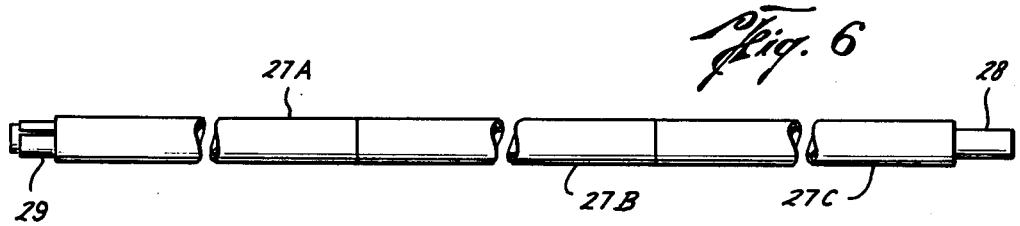
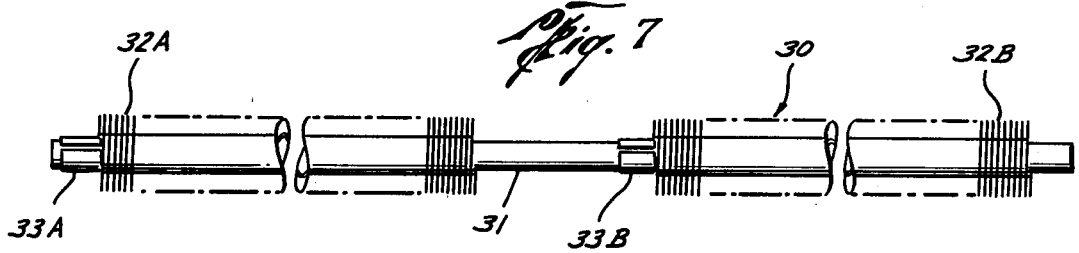
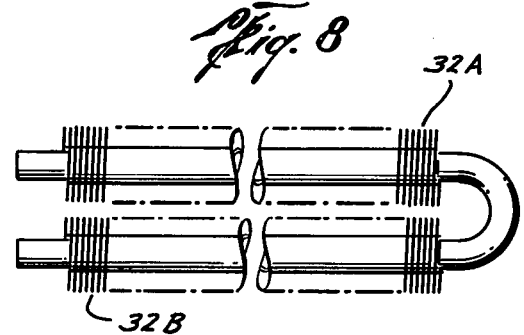
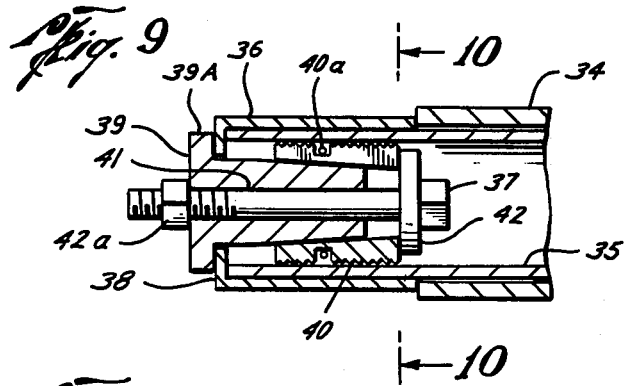
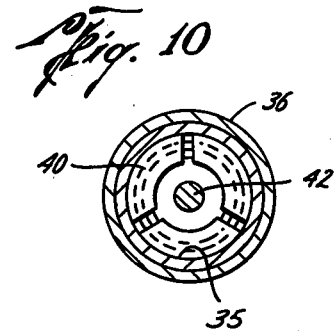
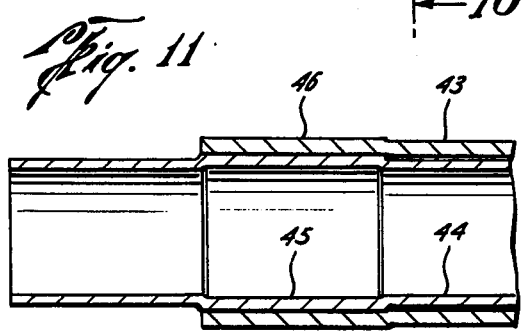
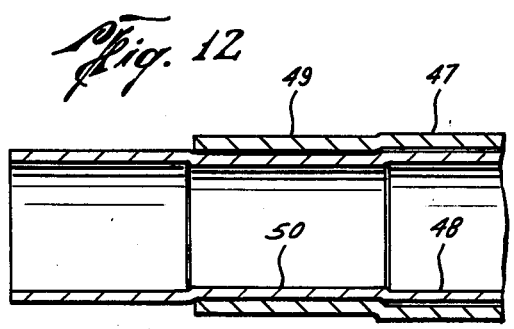

METHOD OF MANUFACTURING A BIMETAL FINNED TUBE

This invention relates generally to the manufacture of finned tubes; and, more particularly, to an improved method of manufacturing bimetal finned tubes wherein a tube of fin stock is assembled about a tube liner, and the assembled tubes are passed through an array of rotatable finning discs arranged to raise helical fins on the outer diameter of the tube of fin stock, while, at the same time, pressing its inner diameter tightly against the outer diameter of the tube liner.

The tube liners of finned tubes of this type are generally of a relatively hard metal, such as copper or steel. The tube of fin stock, on the other hand, is normally a relatively soft, easily extrudable metal, such as aluminum. When used in air coolers or other large heat exchangers, the finned tubes are generally in the range of 24 to 30 feet in length, and design criteria will require each tube to have a specific length of liner tube having a minimum length of finned surface. Each end of the bimetal finned tube must be bare of fins for a minimum distance to permit its attachment to the heat exchanger tube sheet.

In a method of this type, the forward or leading ends of the tubes are pushed into the starting discs at the front end of the array, which will take an initial bite into the fin stock, and thus begin to pull the tube of fin stock through the array of discs. This permits the pushing mechansim, which has been extended to the limit of its stroke, to be withdrawn to its original position for pushing a subsequent assembly of tubes into the starting discs, as the assembly continues to be pulled through the array as additional finning discs bite into the stock.

Although the liner tube is frictionally engaged by the inner diameter of the tube of fin stock to cause it to be moved therewith, the fin stock is not pressed tightly against the tube liner until it begins to move through the additional discs which follow the starting discs. If the tolerance between the discs and the fin stock is not close enough, the fin stock will not be pressed sufficiently tightly against the tube liner, and, as a result, the discs may push the leading end of the fin stock longitudinally away from the leading end of the tube liner, thereby rendering the bimetal finned tube unusable due to an excess length of bare liner tube at one end and/or less than the required length of finned surface.

Also, and as explained in U.S. Pat. No. 2,586,653, which discloses a method of this type, the tube of fin stock is inherently stretched and thus caused to slip rearwardly along the length of the tube liner as the fins are extruded thereon. If the tube of fin stock is too short, it will not stretch into the desired length and number of fins, and the finned tube will be unusable, as noted above. Consequently, it has been the practice to overcompensate for stretch by using excessively long and/or thick tubes of fin stock. However, due at least in part to the large tolerances in the diameters of the tubes, as obtained from the manufacturer, it has been impossible to predetermine with any degree of consistency the extent to which the fin stock must be pressed radially into engagement with the tube liner, and thus the amount it will stretch during extrusion of the required number and size of fins, so that upon completion of the finning operation, substantial lengths of finned stock must be stripped from the tube liner. This wastage of aluminum or other fin stock material has become an ever increasing problem with continuing increases in the cost of the material. Also, of course, the need for stripping these excess portions of fin stock requires time, equipment and labor, which add to the cost of manufacture.

Over and above the foregoing, the slippage of the fin stock along the tube liner inherently detracts from its intimate contact therewith, and thus from the heat transfer capabilities across their interface. Furthermore, the stretch of fin stock imposes flexure on the discs which decreases their useful life, and results in machine down time during repairs and disc replacement.

There are occasions in which it would be desirable to extrude fins on separate tubes of fin stock disposed about a single tube liner. For example, there may be a readily available supply of odd sizes of tubes of fin stock, which would otherwise be scrapped. Also, it may be desirable to extrude discontinuous lengths of fins on longitudinally spaced tubes of fin stock disposed about a single tube liner, and then bend the liner intermediate the tubes of fin stock to form a U-shaped, bimetal finned tube. However, the equipment for initially pushing the leading end of the assembly of tubes into the finning discs is not adapted to handle multiple tubes of fin stock, and the cost of modifications required to adapt it for these purposes would outweigh the loss of scrap material and not justify departure from the present practice of forming the U-shaped tubes from separate lengths of finned tubes welded to 180° U-bends.

An object of this invention is to provide a method of manufacturing such finned tubes which involves little or no wastage of fin stock, and, more particularly, in which there is little or no slippage of the fin stock along the tube liner during extrusion of the fins.

Another object is to provide such a method which is simple and inexpensive and involves a minimum of preparation and down time in the overall fin forming operation.

Still another object is to provide such a method which is especially useful in the extrusion of fins on separate tubes of fin stock, of equal or unequal size, and whether disposed in end-to-end or spaced-apart relation about the liner tube.

These and other objects are accomplished, in accordance with the illustrated embodiments of the present invention, by a method of the type described in which the trailing end of the tube of fin stock is restrained against longitudinal movement away from its leading end, and thus from the leading end of the tube liner, as the fin stock is pressed tightly against the tube liner and fins are extruded thereon. Consequently, there is little or no stretch in the tube of fin stock, and thus no appreciable wastage of fin stock material, because, without such stretch, the tubes of fin stock may be of a length and thickness for forming the desired number and size of fins. Also, since there is no significant stretch, and thus insignificant slippage of the fin stock along the tube liner, the bond therebetween and thus the heat transfer characteristics of the resulting bimetal finned tube are better.

Still further, since this restraint inherently prevents movement of the leading end of the tube of fin stock away from the leading end of the tube liner, as the assembly of tubes is moved through the array of finning discs, it's unnecessary to provide complex equipment for pushing the leading end of each of a plurality of tubes of fin stock into the discs at the front end of the array. Instead, when such separate tubes of fin stock are disposed in end-to-end relation about the tube liner, a single restraint on the trailing end of the trailing tube of fin stock will hold the leading ends of all such tubes in the required position; and, on the other hand, when such separate tubes are arranged in longitudinally spaced-apart relation, as when the bimetal finned tube is to be bent into a U-shape, a single restraint on the trailing end of each such tube will prevent stretch thereof.

The restraint may be imposed in a number of different ways. For example, a sleeve may be disposed about the tube liner near its trailing end and in abutment with the trailing end of the tube of fin stock. The sleeve may be secured to the tube liner by suitable means, such as an adhesive, or it may be fitted over the tube liner and releasably held thereon by means attached to the tube liner. Alternatively, the restraint may be imposed by rolling a portion of the tube liner out against the trailing end of the tube fin stock, or by rolling the trailing end of the tube of fin stock inwardly against a portion of the tube liner. Still further, the restraint may be reinforced by means of a suitable adhesive between the rolled portions of the tubes.

In fact, it may be found that sufficient restraint is imposed merely by adhesive between the trailing end of the tube of fin stock and an adjacent outer portion of the tube liner.

In the drawings, wherein like reference characters are used throughout to designate like parts:

FIG. 6 is a side elevation view of a plurality of tubes of fin stock assembled about a tube liner, with a restraining sleeve about the tube liner in position to abut one end of the leftmost end of fin stock, and with the assembly of tubes interrupted along its length;

FIG. 7 is a perspective view of a bimetal finned tube in which longitudinally separated tubes of fin stock assembled about a single tube liner have each been restrained by sleeves disposed about such liner so as to permit fins to be raised thereon, as shown in connection with FIGS. 2 to 4, and with such finned tube interrupted along its length;

FIG. 8 is a view of the bimetal finned tube shown in FIG. 7 upon removal of the restraining sleeves therefrom and bending of the intermediate unfinned portion to form a U-shaped bimetal finned tube'

FIG. 9 is a cross-sectional view of one end of a tube liner having a tube of fin stock disposed thereabout and restrained at its adjacent end by means of a sleeve held in place on the tube liner by means of a clamp;

FIG. 10 is a cross-sectional view of the tube liner, sleeve and clamp, as seen along broken line 10—10 of FIG. 9;

Figure 1:
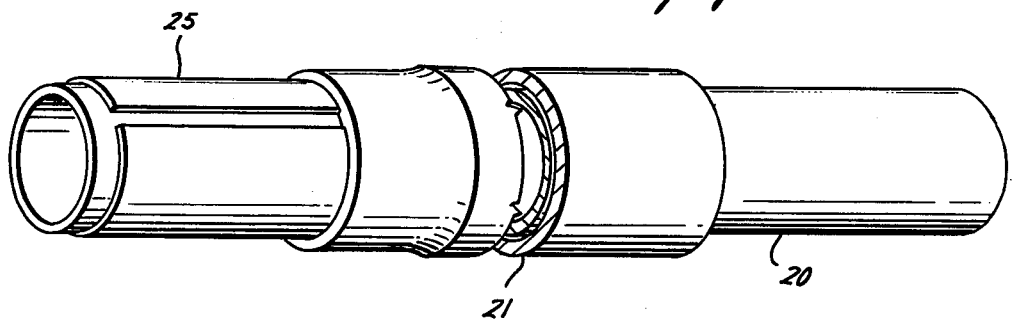
FIG. 1 is a perspective view of a tube of fin stock assembled about a tube liner, with one end of the tube stock being restrained by means of a sleeve secured about the tube liner in abutment with such end of the tube of fin stock, and with the assembly of tubes interrupted intermediate its opposite ends.
Figure 2:
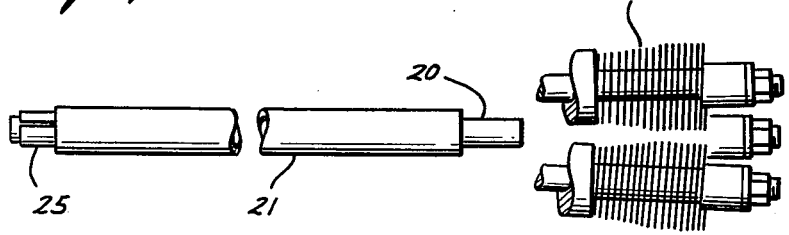
FIG. 2 is a side elevational view of the interrupted assembly of tubes shown in FIG. 1, disposed to the left of an array of finning tubes preparatory to passage therethrough.
Figure 3:
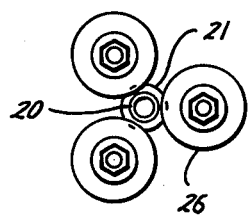
FIG. 3 is an end view of the array and assembly, as seen along broken line 3—3 of FIG. 2.

FIG. 11 is a cross-sectional view of an end of a tube liner having a tube of fin stock assembled thereabout, with the trailing end of the fin stock restrained by a portion of the tube liner which has been rolled out into tight engagement with the inner diameter thereof; and FIG. 12 is a cross-sectional view of an end of a tube liner having a tube of fin stock assembled thereabout, with the trailing end of the fin stock restrained by having its end rolled inwardly into tight engagement with a portion of the tube liner.

With reference now to the details of the above-described drawings, the assembly of tubes illustrated in FIGS. 1 to 4 includes a tube liner 20 and a tube 21 of fin stock assembled thereabout. As indicated by the interrupted portion of the assembly best shown in FIG. 1, the inner diameter of the tube 21 is somewhat larger than the outer diameter of the tube 20 to permit it to slide thereover. The tube 21 of fin stock is shorter than the tube liner 20 and is located generally intermediate the opposite ends of the tube liner, so that the bimetal finned tube to be formed from the assembly, and indicated in its entirety in FIG. 5 by reference character 22, will have bare portions 23 and 24 of generally equal length at its opposite ends, as is ordinarily required in the assembly of the finned tubes in tube sheets.

With the tube 21 assembled about the tube liner 20 in the manner described, a longitudinally split sleeve 25 is disposed about the bare left end of the tube liner so as to abut at its righthand end with the left end of the tube 21 of fin stock. The sleeve fits rather closely about the tube liner and may be secured thereto by an adhesive, or any other suitable means. Although the sleeve is ordinarily thicker than the slight clearance between the tube liner and tube of fin stock, and would thus abut at least a portion of the left end of the tube of fin stock, the latter is preferably swaged down upon the tube liner so as to bring it into tight engagement therewith. This widens the surface on the left end of the tube of fin stock engaged with the right end of the sleeve 25, thereby avoiding any possibility that the left end of the tube of fin stock will be caused to slip over the sleeve 25 as the assembly of tubes is moved through the array of finning heads.

With the assembly of tubes prepared in this manner, it is moved into a position in which its right or leading end is opposite the left or front end of an array of finning discs 26. As well know in the art, the finning discs are arranged in a set of one or more arrays, and preferably, as shown in the drawing, in a set of three equally spaced-apart arrays of disc mounted on arbors having their axes disposed at a slight angle to the longitudinal axis of movement of the assembly. The arbors for the finning discs are caused to be rotated by suitable means and are arranged in such a manner that they will form helical fins on the fin stock and cause the assembly to move axially through the array.

More particularly, and as described in the aforementioned U.S. Pat. No. 2,586,653, when an assembly of tubes of the type contemplated by the present invention is moved coaxially through the array, the finning discs will not only raise fins on the fin stock, but will also press the inner diameter of the fin stock tightly against the outer diameter of the tube liner. In the absence of the present invention, wherein the left or trailing end of the tube of fin stock is unrestrained, the fin stock, when pressed inwardly in this manner, will not only have fins extruded thereon, but will also stretch in a direction away from the finning discs. However, and as previously described, any such tendency for the tube 21 of fin stock to stretch is restrained by means of the sleeve 25, whereby, in accordance with the present invention, there is little or no slippage of the tube of fin stock along the tube liner.

Figure 4:
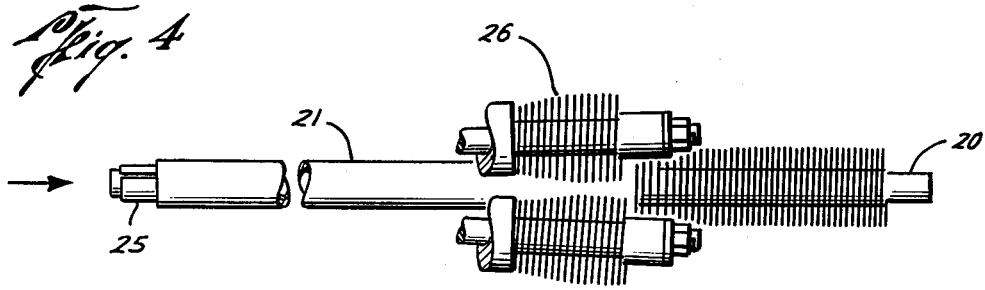
FIG. 4 is a view similar to FIG. 2, but with the assembly of tubes passed partially through the array, so as to raise fins on the righthand end of the fin stock.
Figure 5:
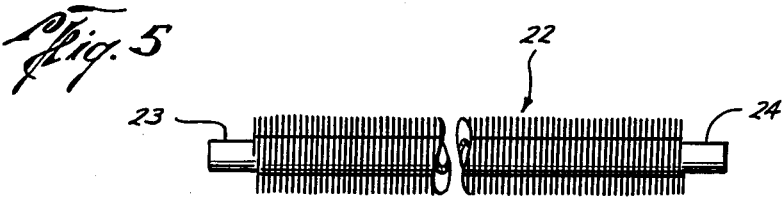
FIG. 5 is a side elevational view of the bimetal finned tube following its passage through the array of finning discs.

As previously described, the finning disc on the left or front end of each array are so arranged as to take an initial bite in the tube of fin stock, which causes the tube assembly to rotate and move from left to right through the array. As the tube assembly moves through the array, the inner surface of the fin stock tube is pressed into intimate contact with the outer surface of the liner tube and, at the same time, the rotating finning discs seize the fin stock as they continue to extrude fins along the length of the tube of fin stock, as indicated in FIG. 4.

When the assembly of tubes has moved through the array of finning discs, the inner diameter of the tube of fin stock will be pressed tightly against the outer diameter of the tube liner, and the fins will be extruded along the full length thereof. More particularly, this will have been accomplished without appreciable stretch of the tube of fin stock, so that there is no wastage of fin stock since the trailing end of the tube of fin stock has been restrained against movement away from its leading end, and there is no need to strip excess fin stock from the trailing end of the tube liner. Furthermore, there has been no slippage of the tube of fin stock along the tube liner, so that the inner diameter of the tube of fin stock is tightly engaged against the outer diameter of the tube liner to form optimum heat exchange contact therewith. More particularly, when the assembly has been moved relatively through the array, it is merely necessary to remove the sleeve 25 from the lefthand end of the tube liner to expose the bare tube portion 23 at the trailing end of the tube liner.

Although the leading end of the tube of fin stock may stretch a small amount in a direction away from its trailing end, during the short interval of time required to press the inside surface of fin stock tube 21 into tight engagement with the outside surface of liner tube 20, this need not create a stipping or waste situation since the length of fin stock tube 21 can be reduced to compensate for this forward stretch. That is, since the trailing end of the fin stock is restrained, the stretch in this short length thereof can be predicted.

As previously described, in the assembly of tubes shown in FIG. 6, a plurality of tubes 27A, 27B and 27C have been assembled about a single tube liner 28 in end-to-end arrangement and generally symmetrically of the opposite ends of the tube liner. As in the case of the single tube 21 disposed about the tube liner 20, as described in connection with FIGS. 1 to 5, each of the tubes of fin stock 27A, 27B and 27C slides over the tube liner 28 to permit their assembly thereon in the manner shown. As will be appreciated, the tubes of fin stock may be of different lengths, and, in some cases, may be of different outer diameters.

In any event, when assembled in the manner described, the tubes of fin stock are restrained against movement from right to left by means of a sleeve 29, which may be identical to the sleeve 25 described in connection with FIGS. 1 to 5, secured to the left or trailing end of the tube liner for abutment with the left or trailing end of the leftmost tube 27A of fin stock. In this manner, when the righthand or leading end of the assembly of tubes is moved through an array of finning tubes, such as that shown in FIGS. 2 to 4, sleeve 29 will restrain all the tubes of fin stock from movement in a direction away from the leading ends of the tube liner 28 and righthand tube of fin stock 27C. Consequently, a continuous length of fins may be extruded upon the successive tubes of fin stock in the same manner as the fins would be extruded thereon if the tubes of fin stock were a single continuous tube. In like manner, the inner diameters of all of the tubes of fin stock will be pressed tightly against the outer diameter of the single tube liner 28, without substantial slippage therealong, and thus to form optimum heat transfer contact therewith. Then, after the assembly of tubes are moved through the array of finning discs, the sleeve 29 may be removed from the lefthand or trailing end of the tube liner 28 to complete manufacture of the bimetal finned tube. As previously described, this method is particularly well suited for using odd pieces of fin stock, which otherwise might not be usuable according to present finning practices.

As previously described, the bimetal finned tube shown in FIG. 7, and indicated in its entirety by reference character 30, comprises a single tube liner 31 having longitudinally spaced-apart lengths 32A and 32B of fins extruded thereon and pressed tightly thereagainst. In the manufacture of the bimetal finned tube 30, a pair of tubes of fin stock, each of a length corresponding to the finned lengths 32A and 32B, are assembled about the tube liner 31 - in this particular embodiment of the invention, generally symmetrically of the midpoint of the tube liner 31. When the tubes of fin stock are so assembled, sleeves 33A and 33B, which may be identical to the sleeves 25 and 29, are secured to the tube liner adjacent the left or trailing end of each such tube of fin stock. Thus, sleeve 33A is secured thereto to abut with the lefthand or trailing end of the tube of fin stock to be extruded into the finned length 32A, and the sleeve 33B is secured to the tube liner in position to abut the lefthand end of the tube of fin stock to be extruded into the finned length 32B.

When so prepared, the assembly of tubes is moved from left to right through an array of finning tubes, such as that previously described. During such passage through the arrays, fins will be raised first on the righthand tube of fin stock and then on the lefthand tube of fin stock to form finned lengths 32A and 32B, in each case the tube of fin stock being restrained from movement away from its leading end by means of the sleeve abutting its trailing end. The spacing between the tubes of fin stock may be such that the front end of the finning discs of the array will bite into the leading end of the left-hand tube of fin stock prior to disengagement of fins on the rear end of the array with the trailing end of the righthand tube of fin stock. If not, suitable apparatus may be provided for moving the partially formed assembly of tubes from right to left as the finning discs disengage from the righthand tube.

In any event, when the bimetal finned tube has been passed through the array of finned discs, as shown in FIG. 1, the sleeves 33A and 33B may be removed from the tube liner thereof. At this time, the tube liner may be bent along the intermediate bare portion thereof so as to bring the fin lengths 32A and 32B into parallel to one another as shown in FIG. 8.

As shown in FIG. 9, the trailing end of a tube 34 of fin stock is disposed about a tube liner 35 and restrained from longitudinal movement in a direction away from its leading end by means of a sleeve 36 held in a position abutting the end of tube 34 by means of a clamp 37 releasably connected to the liner tube. In this case, the sleeve may be of solid circumferential extent, and, in any event, has a flange 38 on its lefthand end which is held between the end of the tube liner 35 and a flange 39A on the lefthand end of a central body 39 of the clamp when the latter is so connected to the tube liner. When released from the tube liner, the clamp may be removed therefrom to permit the sleeve 36 to be reused with other tube assemblies.

Thus, as shown, the body 39 of the clamp is adapted to extend into the trailing end of the tube liner 35 and has a tapered righthand portion about which the toothed slips 40 are disposed. The slips are surrounded by a garter spring 40a and thus normally urged inwardly and to the right over the conical portion of the body 39 to permit them to move into the trailing end of the tube liner. However, when disposed within the tube liner, the slips may be moved to the left over the clamp body and thus forced radially outwardly so as to grip the interior of the tube liner. For this purpose, a bolt 41 extends through the clamp body and has an enlarged head on its righthand end which holds a washer 42 against the righthand ends of the slips 40 when a nut 42a is made up on its left end. Thus, tightening of the nut will move the washer 42 to the left and thus cause the slips 40 to move outwardly against the tube liner, while loosening the nut will permit the washer 42 to move to the right and spring 40a to withdraw the slips to a position in which the clamp may be installed or removed from within the tube liner.

As shown in FIG. 11, the trailing end of a tube 43 of fin stock may be assembled about a tube liner 44 and restrained against longitudinal movement away from its leading end by the tight engagement therewith of a portion of the tube liner 45. For this purpose, such portion of the tube liner has been rolled outwardly against the trailing end of the tube fin stock, and, as indicated at 46 in FIG. 11, this may actually distort the trailing end of the tube of fin stock outwardly a small amount.

As shown in FIG. 12, a tube 47 of fin stock assembled about a tube liner 48 may have its trailing end restrained against longitudinal movement away from its leading end by having its trailing end rolled inwardly at 49 into tight engagement with an adjacent portion of the tube liner. As indicated at 50, this may also distort such portion of the liner radially inwardly a small amount.

In either event, an adhesive may be applied between the tightly engaged surfaces of the tube of fin stock and tube liner, in order to strenghen the restraint provided thereby. In fact, it may be found that adhesive alone, or at least with a lesser degree of rolling, may provide the required restraint.

From the foregoing it will be seen that this invention is one well adapted to attain all of the ends and objects hereinabove set forth, together with other advantages which are obvious and which are inherent to the apparatus.

It wll be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A method of manufacturing finned tubes for heat exchangers, comprising the steps of
    assembling a tube of fin stock about a tube liner,
    causing the assembly of tubes to pass through an array of finning discs arranged to press the tube of fin stock onto the tube liner while extruding fins thereon progressively from one end to the other thereof, and
    restraining said other end of the tube of fin stock against longitudinal movement away from said one end thereof during such passage of the assembly of tubes through said array 2. A method of manufacturing finned tubes for heat exchangers, comprising the steps of
    assembling a pair of tubes of fin stock in end-to-end relation about a tube liner,
    causing the assembly of tubes to pass through an array of finning discs arranged to press first one and then the other tube of fin stock onto the tube liner while extruding fins on each progressively from one end to the other thereof, and
    restraining the other end of said other tube of fin stock against longitudinal movement away from said one end thereof during such passage of the assembly of tubes through said array.

3. A method of manufacturing finned tubes for heat exchangers, comprising the steps of
    assembling a pair of tubes of fin stock in longitudinally spaced-apart relation about a tube liner,
    causing the assembly of tubes to pass through an array of finning discs arranged to press first one and then the other tube of fin stock onto the tube liner while extruding fins thereon on each progressively from one end to the other thereof, and
    restraining the other end of each of said tubes of fin stock against longitudinal movement away from said one end thereof during passage of the assembly of tubes through said array.

4. A method of manufacturing finned tubes for heat exchangers, comprising the steps of
    assembling a tube of fin stock about a tube liner,
    imposing a restraint on the ability of the trailing end of the tube of fin stock to move in a direction away from the leading end of the tube liner, and, while the restraint is so imposed,
    causing the assembly of tubes to be passed through an array of finning discs arranged to press the tube of fin stock onto the tube liner while extruding fins on the tube of fin stock progressively from its leading to its trailing end.

5. A method of the character defined in claim 4, wherein the restraint is imposed by a sleeve disposed about the tube liner near its trailing end and in abutment with the trailing end of the tube fin stock.

6. A method of the character defined in claim 5, wherein
the sleeve is secured to the tube liner by adhesive.

7. A method of the character defined in claim 5, wherein
the sleeve is fitted over the tube liner and releasably held thereon by means attached to the tube liner.

8. A method of the character defined in claim 4, wherein
the restraint is imposed by rolling a portion of the tube liner out against the trailing end of the tube of fin stock.

9. A method of the character defined in claim 4, wherein
the restraint is imposed by rolling the trailing end of the tube of fin stock inwardly against a portion of the tube liner.

10. A method of the character defined in claim 4, wherein
the restraint is imposed by an adhesive applied between the trailing end of the tube of fin stock and an adjacent surface of the tube liner.

* * * * *